United States Patent
Moorman

(10) Patent No.: US 6,591,958 B1
(45) Date of Patent: Jul. 15, 2003

(54) PRESSURE CONTROL APPARATUS FOR A TORQUE-TRANSMITTING MECHANISM

(75) Inventor: Steven Patrick Moorman, Dexter, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/093,150

(22) Filed: Mar. 7, 2002

(51) Int. Cl.[7] .............................................. F16D 25/12
(52) U.S. Cl. .................................. 192/85 R; 477/156
(58) Field of Search ..................... 192/85 R, 109 F; 477/158, 156

(56) References Cited

U.S. PATENT DOCUMENTS

| | | | | | |
|---|---|---|---|---|---|
| 3,327,554 A | * | 6/1967 | Searles | ...................... | 477/156 |
| 3,847,179 A | * | 11/1974 | Shellman | ..................... | 137/596 |
| 4,126,059 A | * | 11/1978 | Smemo | ..................... | 192/87.19 |
| 4,309,469 A | * | 1/1982 | Varona | ......................... | 428/74 |
| 5,833,573 A | * | 11/1998 | Inuzuka et al. | ............. | 477/156 |
| 6,024,663 A | * | 2/2000 | Suzuki et al. | ............... | 475/123 |

FOREIGN PATENT DOCUMENTS

JP 3-209055 A * 9/1991

* cited by examiner

*Primary Examiner*—Rodney H. Bonck
(74) *Attorney, Agent, or Firm*—Leslie C. Hodges

(57) ABSTRACT

An engagement pressure control apparatus for a torque-transmitting mechanism in a transmission control apparatus includes a regulator valve and a boost valve. The regulator valve provides a controlled pressure rise to a torque-transmitting mechanism within the transmission during a shifting event, and the boost valve is effective to increase the fluid pressure from the regulator valve to the torque-transmitting mechanism when the shift event has been completed, thereby providing a high pressure at the torque-transmitting mechanism to prevent slipping.

10 Claims, 7 Drawing Sheets

PRESSURE CONTROL APPARATUS FOR A TORQUE-TRANSMITTING MECHANISM

TECHNICAL FIELD

This invention relates to engagement pressure control apparatus for torque-transmitting mechanisms and, more particularly, to pressure control apparatus having a modulating pressure override boost scheme.

BACKGROUND OF THE INVENTION

Automatic shifting power transmissions have a plurality of torque-transmitting mechanisms, which are engaged and/or disengaged to establish various drive ratios through the transmission. During a ratio change, at least one torque-transmitting mechanism is being engaged while the ratio is being changed. The engaging torque-transmitting mechanism undergoes a slipping condition during the ratio change to provide a smooth interchange from one ratio to the other.

The torque-transmitting mechanism generally includes a fluid-operated piston, which is pressurized by the output pressure of an engagement regulator valve. The regulator valve controls the rise in pressure for the clutch piston in a controlled manner, such that a smooth engagement of the torque-transmitting mechanism is achieved. The regulator valve must also provide a high substantially constant pressure after the torque-transmitting mechanism is fully engaged. This is termed the "holding requirement" for the torque-transmitting mechanism.

Generally, most transmissions utilize a regulator valve that regulates from substantially zero pressure to the maximum or holding pressure for the torque-transmitting mechanism along a single curve. This means that the regulator valve is sized to produce a maximum pressure that is equal to the holding pressure for the torque-transmitting mechanism. Often this provides for a pressure increase rate, which does not always provide the best shift feel for the transmission. If the regulator valve is sized to provide the best shift feel, then it does not always have sufficient capacity to hold the maximum torque that might be available to the torque-transmitting mechanism.

SUMMARY OF THE INVENTION

It is an object of the present invention to provide an improved engagement pressure control apparatus for a torque-transmitting mechanism.

In one aspect of the present invention, the engagement pressure control apparatus provides a modulated pressure rise to perform a shifting event and an increase pressure to provide for maximum holding of the torque-transmitting mechanism.

In another aspect of the present invention, the pressure control apparatus includes a regulator valve, which issues the pressure control function to the torque-transmitting mechanism and a control valve, which issues boost pressure commands to the regulator valve.

In another aspect of the present invention the regulator valve provides a pressure step-down function from a mainline pressure source.

In another aspect of the present invention, the regulator valve has a modulating pressure imposed thereon, which controls the pressure output during the shifting portion of a torque-transmitting mechanism engagement.

In another aspect of the present invention, the control valve is pressurized by either the modulating pressure or the mainline pressure to issue a pressure to the regulator valve which is effective to change the engagement pressure level of the output of the pressure regulator valve to a level required for the maximum torque holding event.

DESCRIPTION OF THE EXEMPLARY EMBODIMENTS

Figure 1:
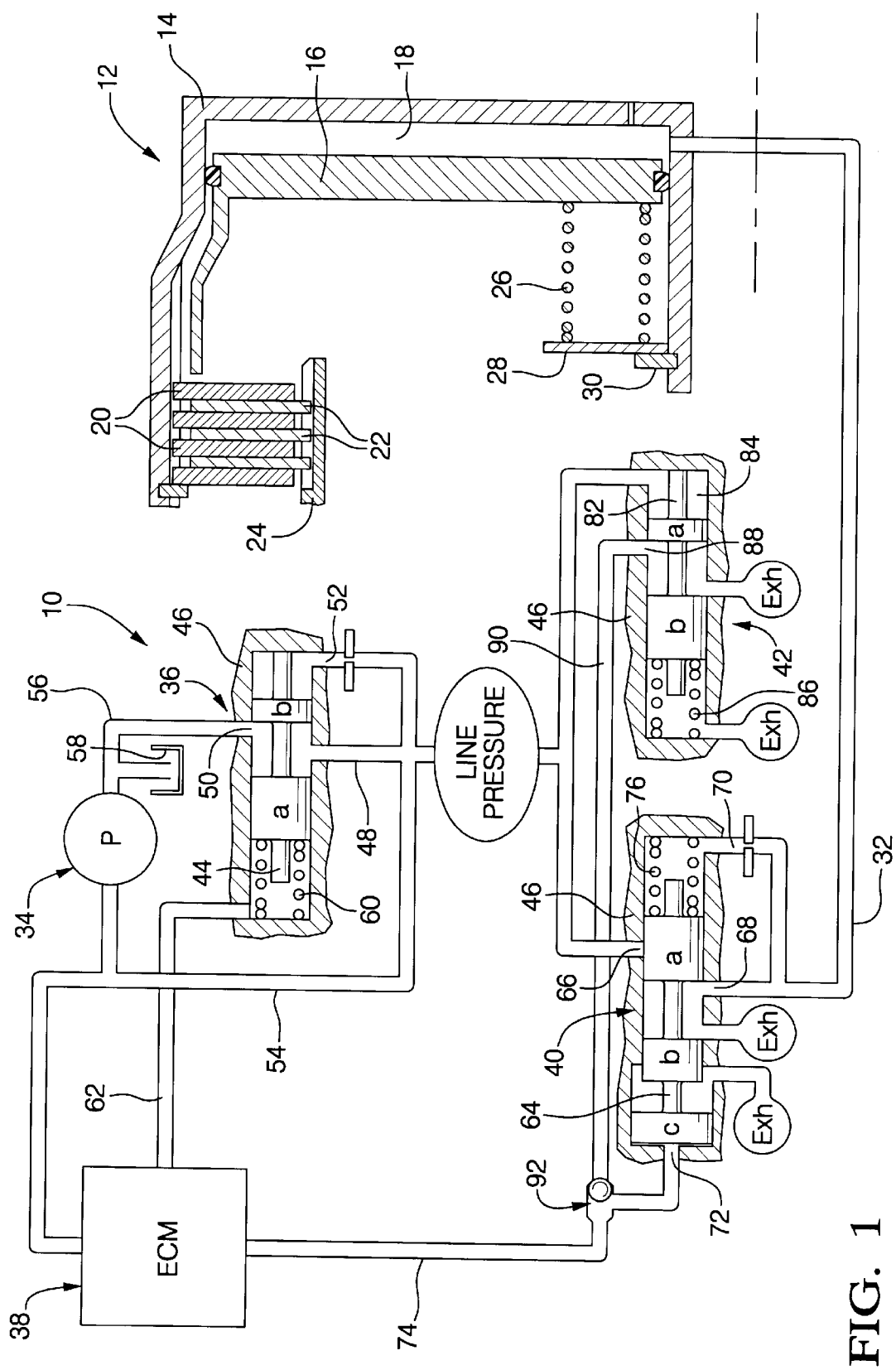
FIG. 1 is a diagrammatic and schematic representation of a portion of a torque-transmitting control circuit, incorporating the present invention, as well as a portion of the torque-transmitting assembly.

Referring to FIG. 1, there is seen an electro-hydraulic control apparatus 10 for controlling, among other things in a transmission, the engagement and disengagement of a torque-transmitting mechanism, generally designated 12. The torque-transmitting mechanism 12 is shown as a rotating type torque-transmitting mechanism, commonly termed a clutch. The torque-transmitting mechanism 12 includes a clutch housing 14 in which is slidably disposed an engagement piston 16. The housing 14 and piston 16 cooperate to form a clutch apply chamber 18.

The torque-transmitting mechanism or clutch 12 also includes a plurality of annular plates 20 which are splined to the housing 14 and a plurality of plates 22 which are splined to an output hub 24. A plurality of clutch return springs 26 are compressed between a retainer plate 28 and the piston 16. Retainer plate 28 is positioned on the housing 14 by a locking ring 30.

When fluid pressure is supplied to the chamber 18, the piston 16 will move leftward, as seen in FIG. 1, to cause frictional engagement between the plates 20 and 22 thereby providing a torque-transmitting connection between the housing 14 and the hub 24. While the torque-transmitting mechanism 12 is shown as a rotating type torque-transmitting mechanism, the present invention will work equally well with a stationary type torque-transmitting mechanism, commonly termed a brake. The chamber 18 is in fluid communication with an apply or clutch feed passage 32 which is connected with the control 10.

The control 10 includes a conventional positive displacement pump 34, a main regulator valve 36, an electronic control module (ECM) 38, an engagement regulator valve 40, and a boost valve 42. The main regulator valve 36 includes a valve spool 44 slidably disposed in a valve body 46. The valve spool 44 has a pair of spaced lands A and B, an inlet port 48, an outlet or return port 50, and a feedback port 52. The inlet port 48 and feedback port 52 are interconnected by a main pressure supply passage 54, which communicates directly with the output of the pump 34. The return port 50 communicates with a return passage 56, which communicates directly with the inlet of the pump 34 and a conventional reservoir 58.

The regulator valve 36 also has a bias chamber 60, which communicates with the ECM 38 through a passage 62. The ECM 38 generates pressure signals, which are used by various control mechanisms within the transmission including the regulator valve 36. The regulator valve 36 receives bias signals in the chamber 60, which represent various powertrain functions, such as vehicle speed, engine throttle position, and engine speed. These signals are generated by conventional pulse-width-modulated valves or other variable pressure producing mechanisms.

The main pressure passage 54 communicates with both the engagement regulator valve 40 and the boost valve 42. The engagement regulator valve 40 includes a valve spool 64, which is slidably disposed in the valve body 46. The regulator valve 40 also includes an inlet port 66, an outlet port 68, a feedback port 70, a modulating pressure control port 72, and a plurality of exhaust ports (exh). The valve spool 64 includes valve lands A, B, and C, with C being larger than the equal diameter valve lands A and B. The valve land A controls fluid communication between the main passage 54 and the feed passage 32. The valve land B controls fluid communication between the feed passage 32 and an exhaust port.

The pressure at the modulating port 72 is supplied through a modulator passage 74, which communicates with the ECM 38. The pressure at the modulating port varies with system signals, such as throttle position and/or vehicle speed. The pressure at the port 72 operates on the land C to urge the valve spool 64 to the right against a bias spring 76 thereby providing communication between the ports 66 and 68. The pressure at port 68 is also delivered to the port 70 to establish feedback pressure acting on the valve land A, thereby modulating the pressure at passage 32 between the pressure in the inlet port 66 and the pressure at the exhaust port. As the pressure in the modulating port 72 increases, the pressure in passage 32 will increase, thereby increasing the pressure in the chamber 18, such that the piston 16 begins to apply the clutch 12.

Figure 2:
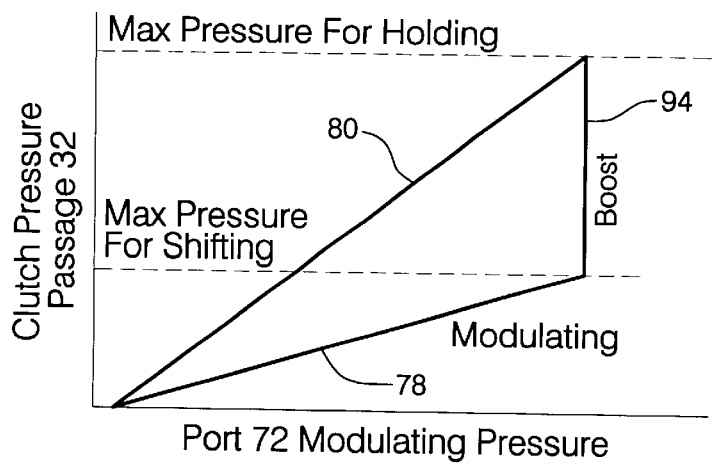
FIG. 2 is a graph representing the modulating event of the present invention and a modulating event of a conventional regulator system.

A curve or line 78, shown in FIG. 2, describes a rise in the pressure in passage 32 as a result of the rise in the pressure in port 72. Also shown in FIG. 2 is a curve or line 80, which represents the operation of a conventional clutch regulating pressure valve. As can be seen in FIG. 2, the clutch pressure of a conventional regulator valve increases much more rapidly than the clutch pressure of the present invention.

The boost valve 42 includes a valve spool 82 slidably disposed in the valve body 46. The valve spool 82 includes two valve lands A and B. The valve land A cooperates with the valve body 46 to form a boost chamber 84, which communicates with the main passage 54. A bias or return spring 86 urges the valve spool 82 rightward in the valve body 46. The valve 42 has a boost port 88, which is in fluid communication with a boost passage 90, which communicates with the port 72 of the regulator valve 40 to a conventional ball check valve 92.

As is well known, the line pressure in passage 54 is a variable pressure, which can be reduced when a shift function is about to be undertaken. The pressure in passage 54 rises as a function of many of the transmission conditions, such as vehicle speed, ratio achieved, throttle position, to name a few. As the line pressure in passage 54 increases during a shift event, the valve spool 82 is moved leftward by pressure acting on the land A until the port 88 is closed from an exhaust port and opened to the pressure in passage 54. The pressure in passage 54 is greater than the pressure in passage 74 resulting in the ball check valve 92 directing the higher pressure through the port 72, such that a rapid increase or boost in clutch engagement pressure is undertaken. This is represented by the curve 94 in FIG. 2. Thus, the pressure in the piston 16 is controlled at a lower pressure rate until the maximum pressure for shifting has been achieved and the shift is completed and then the pressure rises rapidly for the maximum torque holding events.

Figure 3:
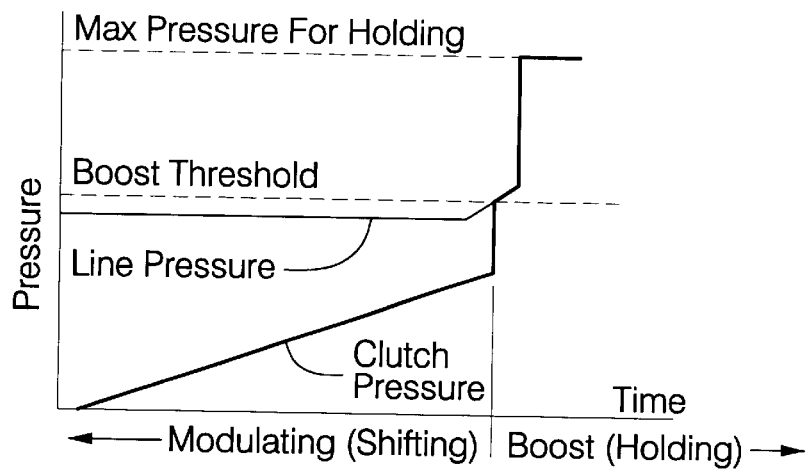
FIG. 3 is a graph representing the modulating and the boost phases of the present invention.

The curve in FIG. 3 shows the relationship between clutch engagement pressure, line pressure, and the boost function. As can be seen, the clutch pressure rises along an increasing curve while the line pressure is fairly constant. When the line pressure begins to increase, the boost threshold is exceeded such that the valve 42 is shifted leftward thereby providing a rapid increase in clutch pressure which will establish the maximum pressure for holding the clutch engaged.

Figure 4:
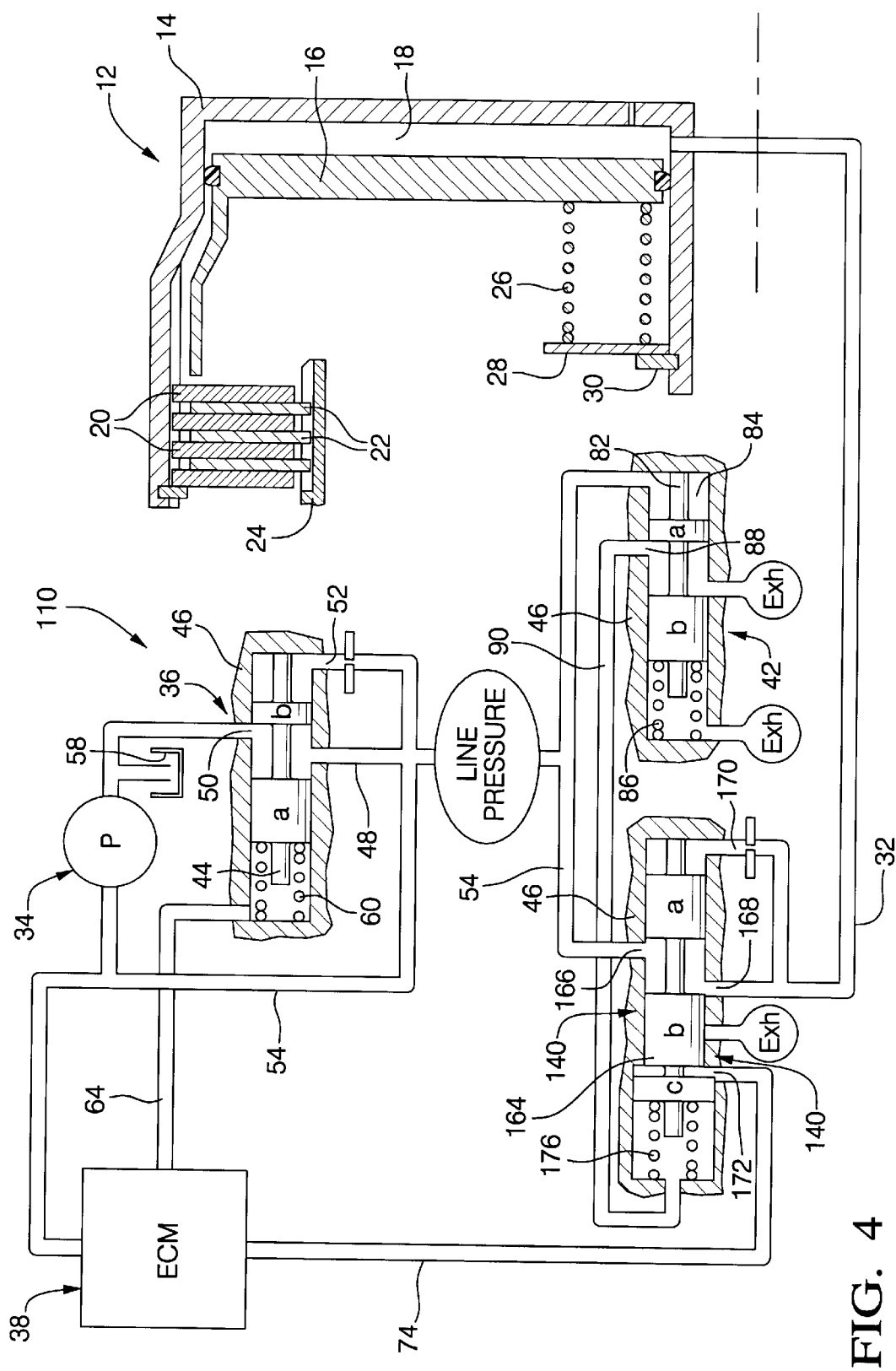
FIG. 4 is a diagrammatic and schematic representation of another embodiment of the present invention.

FIG. 4 describes an alternative embodiment of the invention represented by the control apparatus 110. The apparatus 110 incorporates the same regulator valve 36 and ECM 38, as described above for FIG. 1. Also, the boost control valve 42 is the same as that utilized in FIG. 1. An engagement regulator valve 140 includes a valve spool 164 having three spaced lands A, B, and C and is slidably disposed in the valve body 46.

The regulator valve 140 includes an inlet port 166 which is communicated with the main passage 54, an outlet port 168 which communicates with the clutch apply passage 32, a modulator port 172 which admits fluid from passage 74 to a differential area between lands B and C, and a bias spring 176. With the regulator valve 140, shown in FIG. 4, the modulating pressure in port 172 and the feedback pressure at port 170 are acting in the same direction to overcome the bias spring 176. Therefore, as the modulator pressure increases, the regulator pressure in port 168 and passage 32 will decrease. Thus, during a shifting event, the modulating pressure begins at a high level and is reduced as the output pressure from valve 140 increases.

Also, in a different configuration from FIG. 1, the boost pressure in passage 90 is communicated with the chamber surrounding the bias spring 176, such that an increase in boost pressure will cause an increase in the apply pressure found in the passage 32. The overall effect of the system in FIG. 4 is the same as that shown in FIG. 1. To begin a shift, the modulating pressure in passage 74 is increased to a high level by the ECM 38, such that the valve spool 164 will be moved leftward against the spring 176 thereby closing the port 166. As the shift is to proceed, the modulating pressure in passage 74 will be reduced and the pressure in passage 32 will increase along the line represented by 78 in FIG. 2. Again when the maximum pressure for shifting has been achieved, the boost valve 42 will operate to provide an increase in pressure in the passage 90, such that the outlet pressure at port 168 will be boosted to that of the pressure in passage 54, thereby completing the shift and providing the pressure necessary for the holding event of the torque-transmitting mechanism 12.

Figure 5:
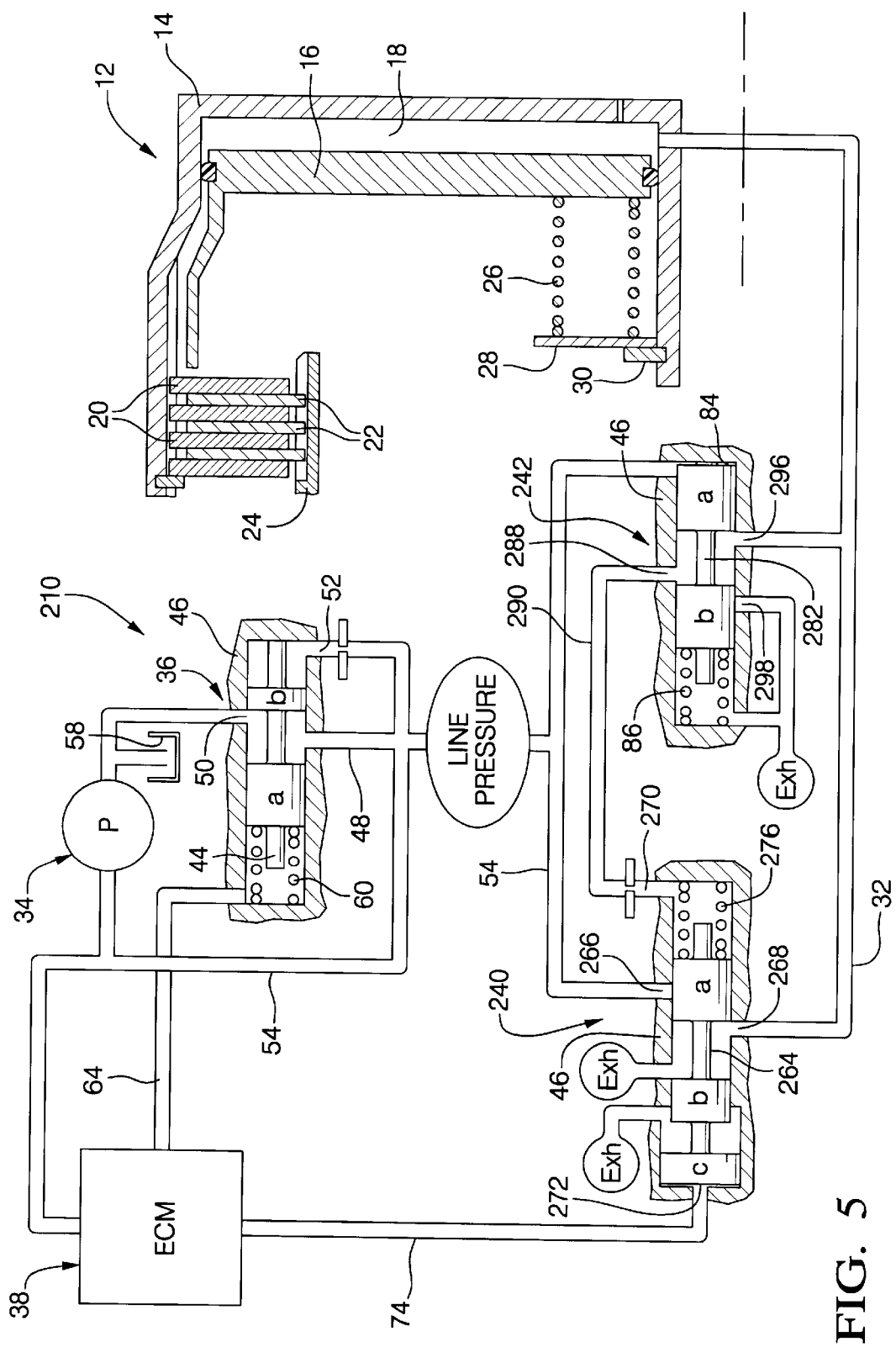
FIG. 5 is a representation of yet another embodiment of the present invention.

A control apparatus 210, shown in FIG. 5, includes the regulator valve 36, the pump 34, the ECM 38, and the torque-transmitting mechanism 12, the same as FIGS. 1 and 2. The control apparatus 210 includes an engagement regulator valve 240 and a boost control valve 242. The regulator valve 240 has a valve spool 264 that is slidably disposed in the valve body 46 and includes three lands A, B, and C. The regulator valve 240 has an inlet port 266 that is connected with the main passage 54 and an outlet or clutch feed port 268 that is connected with the passage 32.

The modulator passage 74 is connected through the modulator port 272 to supply pressure to act on the left end of land C to urge the valve spool 264 rightward against a bias spring 276. The valve 240 has a clutch feedback port 270 that is communicating with a boost passage 290. The boost control valve 242 includes a valve spool 282, which has spaced lands A and B slidably disposed in the valve body 46. The boost control valve 242 includes a port 296 that communicates with the passage 32 and a boost port 288 that communicates with the boost passage 290. The valve spool 282 is urged rightward in the valve body 46 by the bias spring 86. The boost control passage 290 is in fluid communication with the clutch feedback chamber surrounding the spring 276.

During a shifting event, the pressure in passage 74 increases thereby increasing the force on the valve spool 264 to urge the valve spool rightward against the spring 276 to admit fluid communication between the ports 266 and 268 thereby increasing the fluid pressure in the passage 32. Note that the pressure in passage 32 is directed to the chamber surrounding spring 276 to provide the feedback pressure for the valve spool 264.

The pressure in the passage 32 increases in a manner similar to that described above for FIGS. 2 and 3. When the pressure in passage 32 reaches the maximum pressure for shifting, the line pressure in passage 54 will be sufficient to drive the boost valve 242 to open fluid communication between the passage 290 and an exhaust passage as presented at port 298. When port 298 is open, the pressure operating on the right end of valve land A of spool valve 264 is exhausted such that the modulating pressure in passage 74 urges the regulator valve 240 to the right, thereby providing full communication between the main passage 54 and the clutch apply passage 32 such that full engagement pressure for maximum torque holding is available at the torque-transmitting mechanism 12. The curve function between modulating pressure and clutch pressure, as well as between the shifting pressure and the line pressure, is the same as that shown in FIGS. 2 and 3.

Figure 6:
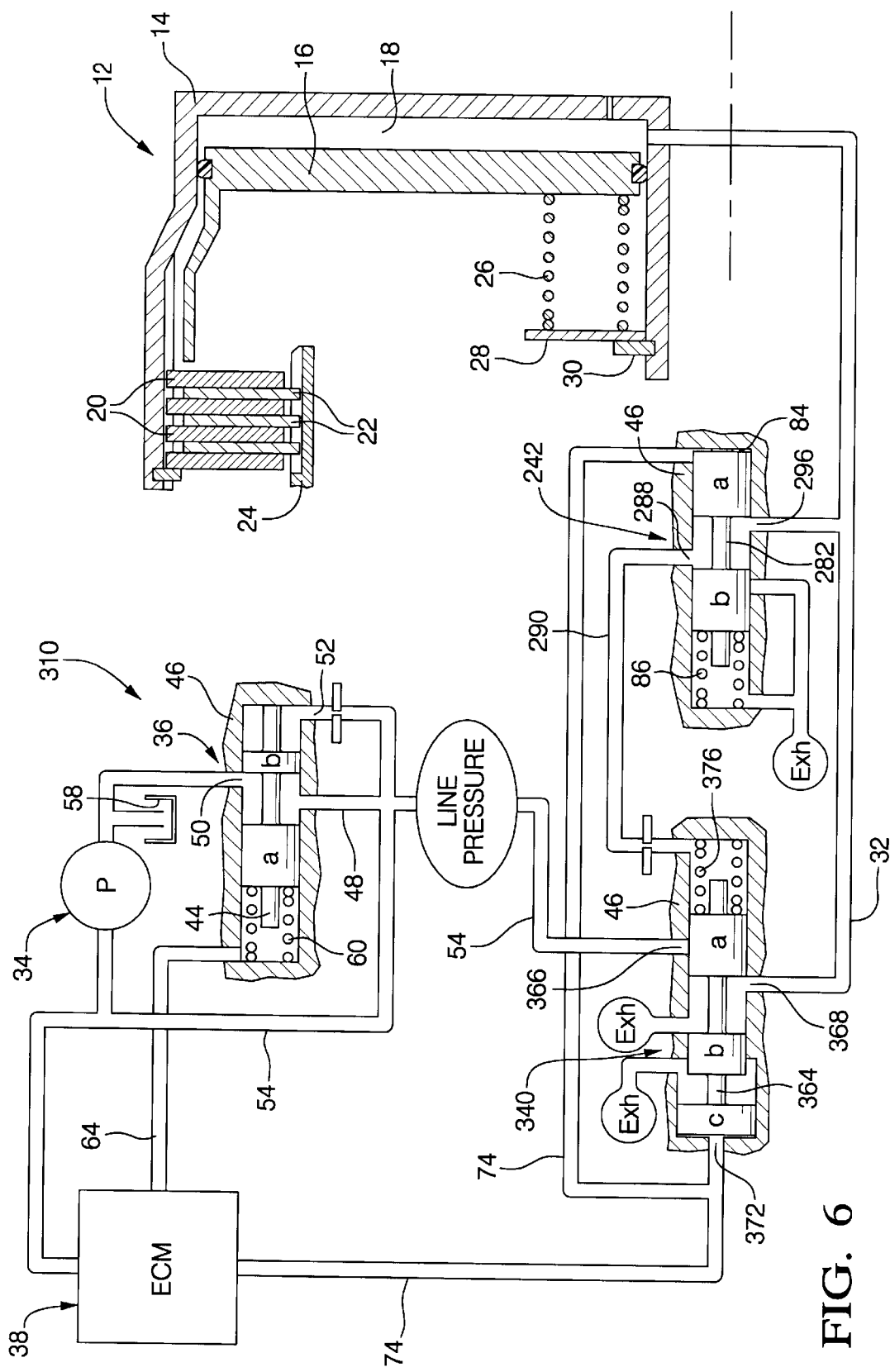
FIG. 6 is a representation of still another embodiment of the present invention.

A control apparatus 310, shown in FIG. 6, includes the pump 34, the regulator valve 36, the ECM 38, and the torque-transmitting mechanism 12, as described above for FIG. 1. The control apparatus 310 includes the same boost valve structure 242, as described above for FIG. 5. The control apparatus 310 includes a regulator valve 340, which includes a valve spool 364 having valve lands A, B, and C slidably disposed in the valve body 46. The valve land C is larger in diameter than the valve lands A and B and therefore a given pressure therein issues a force requiring a higher pressure acting on valve land A to balance the valve spool 364.

The main pressure passage 54 communicates with a port 366 of the valve 340. The clutch apply passage 32 communicates with a port 368 of the regulator valve 340. The pressure in modulating passage 74 communicates with a port 372 of the valve 340. The boost valve 242 has the boost chamber 84 communicating with the modulating passage 74, such that the pressure issued by the ECM 38 operates on the end of the valve land A in counterbalance to the bias spring 86. The boost passage 290 communicates from the space between lands A and B with the passage 32 and also with the chamber surrounding a bias spring 376 of the regulator valve 340.

Figure 7:
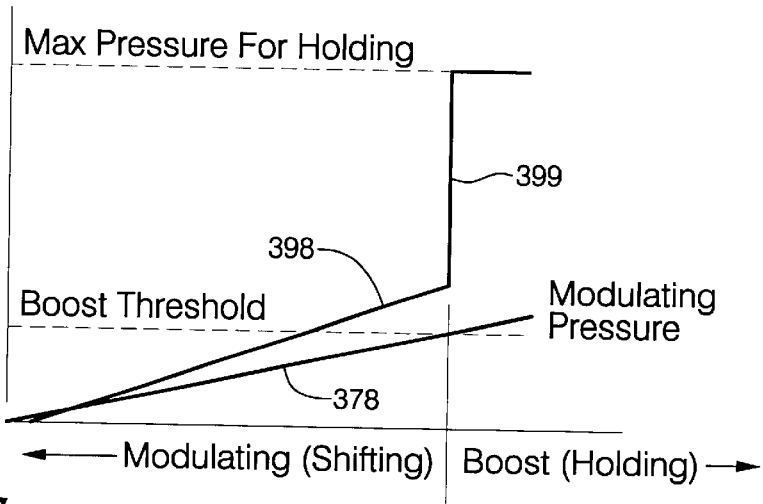
FIG. 7 is a graph representing the modulating and boost phases for the embodiment shown in FIG. 6.

In the position shown, the boost valve 242 directs fluid pressure from the passage 32 to the chamber joining the spring 376. Thus, as the pressure in the modulating passage 74 increases, the pressure in the passage 32 will increase. As is shown in FIG. 7, as the modulating pressure in passage 74 increases along the line 378, the pressure in passage 32 will increase along the line 398. When the pressure in passage 74, as represented by line 378, reaches the boost threshold line, the boost valve 242 will be moved leftward against the spring 86 such that the passage 32 will be disconnected from the passage 290, while the passage 290 is connected with an exhaust passage.

As seen in FIG. 7, the pressure in passage 32 will increase rapidly along the line 399 after the boost threshold has been exceeded. The pressure in the passage 32, and therefore chamber 18 will increase rapidly with the maximum holding pressure for the torque-transmitting mechanism 12.

As with the control apparatus described above for FIGS. 1, 4, and 5, the control apparatus in FIG. 6 provides a controlled pressure rise within the apply chamber 18 until the boost threshold which represents the maximum pressure needed for completing the shift is used, at which time the pressure within the chamber 18 is rapidly increased through the holding pressure requirement for the torque-transmitting mechanism 12.

Figure 8:
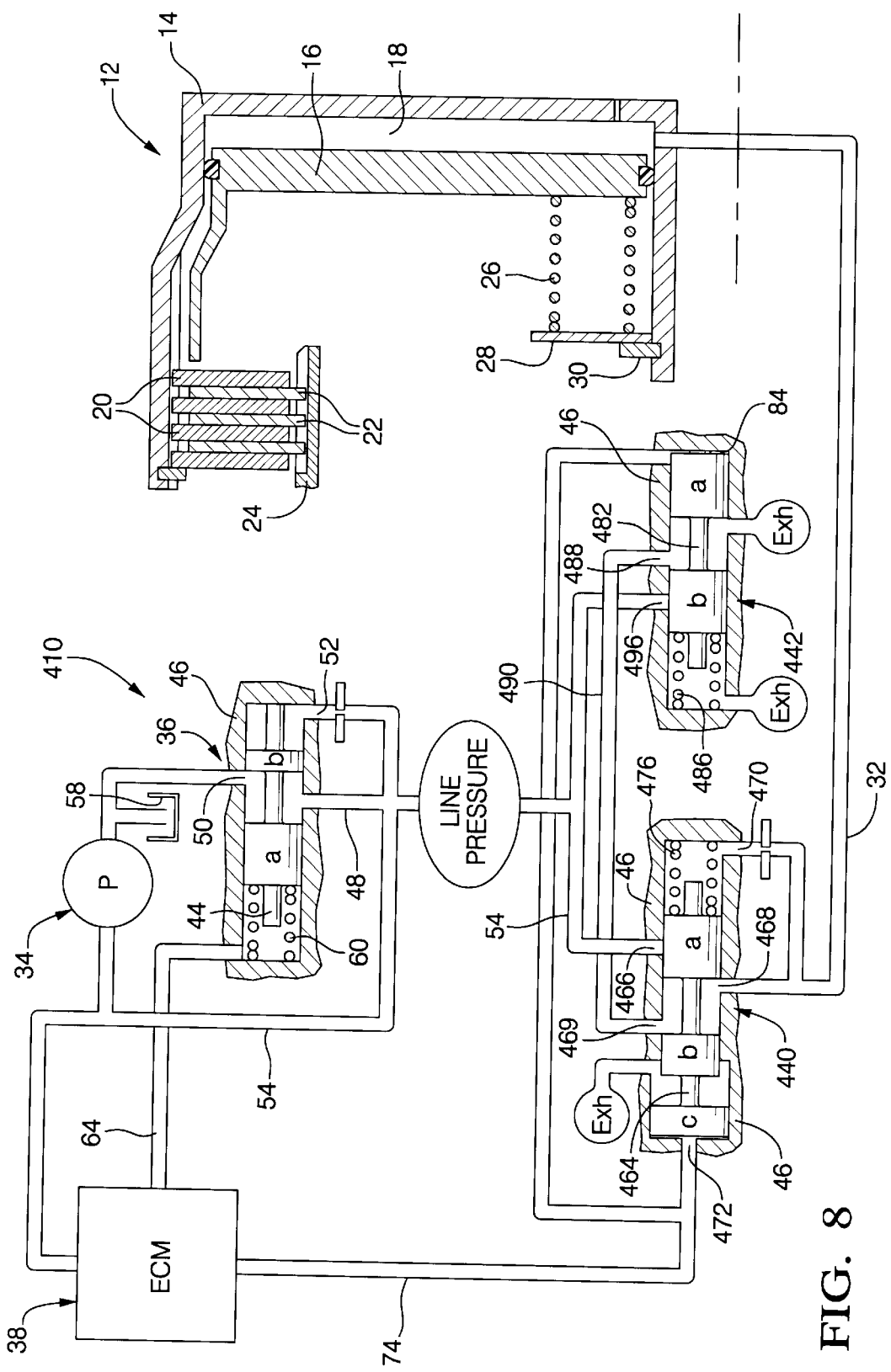
FIG. 8 is yet still another embodiment of the present invention.

A control apparatus 410 shown in FIG. 8 includes the same torque-transmitting mechanism 12, pump 34, regulator valve 36, and ECM 38 as described above for FIGS. 1, 4, 5, and 6. The control apparatus 410 includes a regulator valve 440, which has valve lands A, B, and C slidably disposed in the valve body 46. As with the regulator valves described above, the valve land C is larger in diameter than valve lands A and B, thereby creating a pressure gain between the pressure in the modulating passage 74 and the pressure acting on the end of valve land A.

The valve 440 has an inlet port 466 which communicates with the main passage 54, an outlet port 468 which communicates with the apply passage 32, a port 469 which communicates through a boost passage 490 with a port 488 on a boost control valve 442, and a feedback port 470. The regulator valve 440 is controlled by modulating pressure in passage 74 at a port 472, which urges the valve rightward until the port 466 is open, thereby directing fluid pressure between the ports 466 and 468 into the passage 32. The pressure in passage 32 is directed to the feedback chamber surrounding a spring 476 to balance the spool valve 464.

In the position of the valve shown, the port 469 is connected to an exhaust port through the passage 490 and the boost valve 442. The boost valve 442 includes a valve spool 482 having valve lands A and B slidably disposed in the valve body 46. The boost valve 442 has a boost chamber 84, which communicates with the passage 74. The boost valve 442 also has a main pressure port 496, which communicates with passage 54. In the position shown, the main pressure port 496 is closed by the valve land B and the port 488 is opened to an exhaust passage. When the pressure in the passage 74 reaches the maximum pressure for shifting or boost threshold, the pressure acting in the boost chamber 84 on valve land A will move the valve spool 482 sufficiently leftward to disconnect communication with exhaust and connect communication between port 488 and port 496. Thus, line pressure in passage 54 is introduced into the boost passage 490, which communicates through the regulator valve 440 with the passage 32 as the valve regulates. Therefore, the pressure in passage 32 will increase rapidly to the maximum holding pressure as shown in the curve of FIG. 7. The pressure functions of the control apparatus 410, as represented by a curve or line, is the same as that shown in FIG. 7, which represented the modulating and boost stages of the control apparatus shown in FIG. 6 and FIG. 8.

The control apparatus 410 provides for an increase in clutch apply pressure in passage 32 when the boost pressure is increased through the boost valve 442. Thus, the control apparatus 410 introduces maximum line pressure in passage 54 to both port 466 and port 469 when pressure boost or maximum holding pressure is required at the torque-transmitting mechanism 12. As with the control apparatus shown in FIG. 6, the boost control valve 442 is controlled in movement by the modulating pressure in passage 74.

Figure 9:
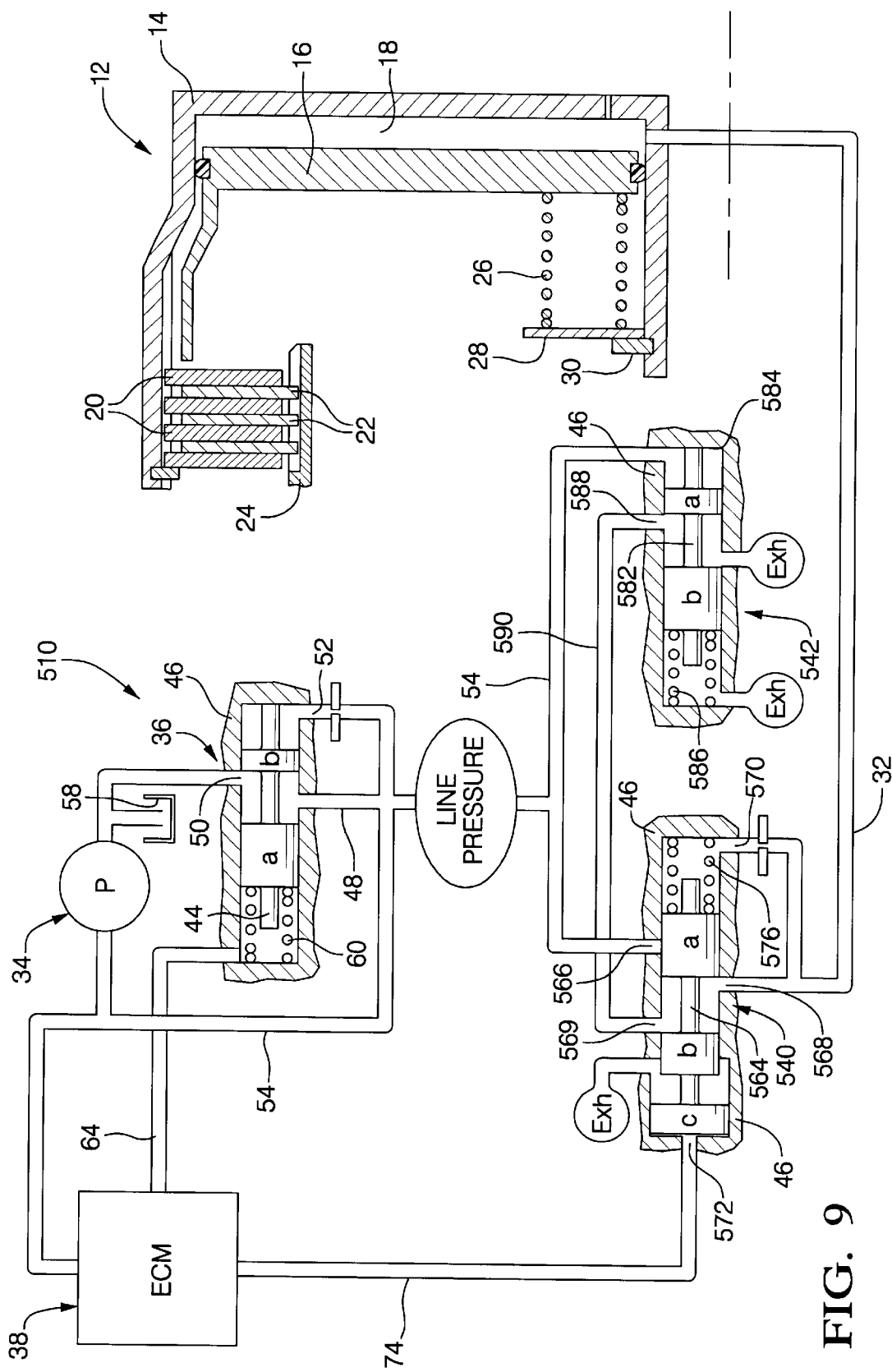
FIG. 9 is a further embodiment of the present invention.

A control apparatus 510, shown in FIG. 9, has the same torque-transmitting mechanism 12, pump 34, main regulator valve 36, and ECM 38, as that shown in FIGS. 1, 4, 5, 6, and 8. The control apparatus 510 includes a torque-transmitting regulator valve 540, which has a valve spool 564 including valve lands A, B, and C slidably disposed in the valve body 46. As with the above-described regulator valve, the valve land C is larger than the valve lands A and B thereby providing for a pressure gain between the passage 54 and the passage 32.

The regulator valve 540 has an inlet port 566 connected with the passage 54, an outlet port 568 in fluid communication with the passage 32 and also with a port 570, and a port 572 communicating with the passage 74. The port 570, as described above for FIGS. 1 and 8, provides a pressure feedback from the apply passage 32 to the chamber surrounding the bias spring 576. A boost valve 542 includes a valve spool 582 having valve lands A and B slidably disposed in the valve body 46. The valve 542 also includes a port 588, which communicates with a port 569 on the regulator valve 540. A boost chamber 584 communicates with the passage 54.

In the position shown, the regulator valve 540 is spring biased to the left by the bias spring 576. As the shift event is requested, the pressure in the passage 74 is increased until the valve spool 564 is moved sufficiently rightward against the spring 576 to permit communication between the ports 566 and 568 while decreasing communication between the ports 568 and 569. As the port 566 is opened, the pressure in the passage 32 will increase thereby increasing pressure in the chamber 18. As described above, the pressure in passage 32 also provides a closing bias by adding pressure to the end of the valve land A to assist the spring 576. Therefore, the pressure in passage 32 increases at a controlled rate determined by the pressure rise of the pressure in the modulating passage 74.

When the pressure in the main passage 54 reaches the boost threshold or the maximum pressure for shifting, the valve spool 582 is urged leftward against a bias spring 586 by fluid pressure in the boost chamber 584. When the valve spool 582 is moved sufficiently leftward, fluid pressure in the passage 54 is communicated through the port 588 and a passage 590 to the port 569 and the regulator valve 540. When this transfer occurs, the pressure in passage 32 will immediately be raised to the boost pressure level for maximum holding of the torque-transmitting mechanism 12. The pressure in passage 32 will be equal to the pressure in passage 54 regardless of the position of the regulator valve 540 as long as the boost valve 542 remains in the boosted position, which is leftward against the spring 586.

As with the systems described above in FIGS. 1, 4, 5, 6, and 8, the clutch apply pressure in the system shown in FIG. 9 increases rapidly to fully apply the torque-transmitting mechanism 12 and the boost pressure in the boost chamber 584 reaches a predetermined pressure level. That pressure level is determined by the bias spring 586 of the boost valve 542. This is true for each of the control systems described herein. However, if desired, the maximum clutch apply pressure can be reduced from maximum line pressure in some instances, however, the spirit and scope of the invention would not be avoided by such a lowering of the maximum apply pressure.

One important feature of the present invention is the use of the boost valve to permit one gain rate of the regulator valve during the shifting event and a boosted pressure at the torque-transmitting mechanism during a holding event.

Obviously, many modifications and variations are possible in light of the above disclosure. Therefore, the invention is only to be limited by the appended claims.

What is claimed is:

1. An engagement pressure control apparatus for a torque-transmitting mechanism having an apply chamber comprising:

a main source of variable fluid pressure;

a modulated source of variable fluid pressure;

a torque-transmitting mechanism regulator valve comprising an inlet connected with said main source, an outlet communicating with the apply chamber to deliver an engagement pressure thereto, means for controlling communication between said inlet and said outlet, and a modulated pressure chamber connected with said modulated source to urge communication between said inlet and said outlet; and a control valve comprising a control chamber in communication with at least one of said main source and modulated source of pressure, a bias means, and a controlled chamber communicating through a boost pressure passage with said torque-transmitting mechanism regulator valve to effect a change in the engagement pressure when a level of the fluid pressure of the source connected thereto exceeds a predetermined value.

2. The engagement pressure control apparatus defined in claim 1 further comprising:

torque transmitting mechanism regulator valve including a feedback port, said boost pressure passage communicating said feedback port with an exhaust port when said predetermined value is exceeded thereby effecting said change in the engagement pressure.

3. The engagement pressure control apparatus defined in claim 1 further comprising:

said engagement pressure rising at a controlled rate in response to an increasing pressure at said modulator source and at a more rapid rate when said predetermined value is exceeded.

4. The engagement pressure control apparatus defined in claim 1 further comprising:

said boost pressure passage communicating said main source to said modulated pressure chamber to replace said pressure from said modulated source when said predetermined value is exceeded.

5. The engagement pressure control apparatus defined in claim 1 further comprising:

said boost pressure passage communicating said main source with a boost port on said torque transmitting mechanism regulator valve when said predetermined value is exceeded to thereby effect communication of only said main source with said outlet.

6. An engagement pressure control apparatus for a torque-transmitting mechanism having an apply chamber comprising:

a main source of variable fluid pressure;

a modulated source of variable fluid pressure;

a torque-transmitting mechanism regulator valve comprising an inlet port connected with said main source, an outlet port communicating with the apply chamber to deliver an engagement pressure thereto, means including a feedback chamber and a bias spring for controlling communication between said inlet port and said outlet port, and a modulated pressure chamber connected with said modulated source to urge communication between said inlet and said outlet; and a control valve comprising a control chamber in communication with at least one of said main source and modulated source of pressure, a bias means, and a controlled chamber communicating through a boost pressure passage with said torque-transmitting mechanism regulator valve to effect a change in the engagement pressure when a level of the fluid pressure of the source connected thereto exceeds a predetermined value.

7. The engagement pressure control apparatus defined in claim 6 further comprising:

said boost pressure passage communicating said feedback port with pressure at said apply chamber when said predetermined value is not exceeded and with an exhaust port when said predetermined value is exceeded thereby effecting said change in the engagement pressure.

8. The engagement pressure control apparatus defined in claim 6 further comprising:

said boost pressure passage communicating said main source with a boost port on said torque transmitting mechanism regulator valve when said predetermined value is exceeded to thereby effect communication of only said main source with said outlet.

9. The engagement pressure control apparatus defined in claim 6 further comprising:

said boost pressure passage communicating said main source to said modulated pressure chamber to replace said pressure from said modulated source when said predetermined value is exceeded.

10. The engagement pressure control apparatus defined in claim 6 further comprising:

said boost pressure passage communicating said main source to a chamber opposing pressure in said modulated pressure chamber when said predetermined value is exceeded.

* * * * *